United States Patent [19]

Steffel

[11] Patent Number: 4,552,535
[45] Date of Patent: Nov. 12, 1985

[54] MECHANICAL ASSEMBLY FOR AUDIO-VISUAL TEACHING MACHINES

[75] Inventor: Steve Steffel, Northfield, N.J.

[73] Assignee: Frank Warren Ferguson, Arlington, Va.

[21] Appl. No.: 611,779

[22] Filed: May 18, 1984

[51] Int. Cl.[4] .............................................. G09B 7/06
[52] U.S. Cl. .................... 434/315; 434/316; 434/318; 434/321; 434/324; 434/335; 369/230
[58] Field of Search ............... 434/310, 321, 324, 335, 434/316; 369/230, 270, 41

[56] References Cited

U.S. PATENT DOCUMENTS

| | | |
|---|---|---|
| 3,353,280 | 11/1967 | Emde . |
| 3,408,749 | 11/1968 | Brudner . |
| 3,483,633 | 12/1969 | Geils et al. . |
| 3,504,445 | 4/1970 | Goldmark et al. . |
| 3,591,930 | 7/1971 | Little et al. . |
| 3,623,238 | 11/1971 | LaPlume et al. . |
| 3,715,811 | 2/1973 | Thompson et al. . |
| 3,718,759 | 2/1973 | Reiffel . |
| 3,718,984 | 3/1973 | Hewitt . |
| 3,718,986 | 3/1973 | Hewitt . |
| 3,720,005 | 3/1973 | Roche . |
| 3,721,493 | 3/1973 | Schneiderman et al. . |
| 3,733,717 | 5/1973 | Montgomery et al. . |
| 3,773,415 | 11/1973 | Carabet et al. . |
| 3,805,412 | 4/1974 | Lambright et al. . |
| 3,829,987 | 8/1974 | Matzsek . |
| 3,871,757 | 3/1975 | Glass et al. . |
| 3,932,948 | 1/1976 | Goddard et al. . |
| 3,953,118 | 4/1976 | Bruchenko . |
| 3,996,671 | 12/1976 | Foster . |
| 4,005,530 | 2/1977 | Takahashi et al. . |
| 4,043,054 | 8/1973 | Crowder . |
| 4,052,798 | 10/1977 | Tomita et al. . |
| 4,122,613 | 10/1978 | Karalus et al. . |
| 4,143,879 | 3/1979 | Wren . |
| 4,305,131 | 12/1981 | Best . |
| 4,356,560 | 10/1982 | Ohnishi ............................ 369/230 |
| 4,422,170 | 12/1983 | Seno ................................. 369/270 |
| 4,460,991 | 7/1984 | Omoto ............................. 369/230 |
| 4,477,894 | 10/1984 | Clurman .......................... 369/270 |
| 4,482,328 | 11/1984 | Ferguson et al. ................ 434/335 |

Primary Examiner—Richard C. Pinkham
Assistant Examiner—Leo P. Picard
Attorney, Agent, or Firm—Jones, Tullar & Cooper

[57] ABSTRACT

An improved audio-visual machine for projecting visual information segments carried by a transparency holder in an audio-visual cartridge, and for reproducing corresponding narrative and control information recorded on a movable storage medium carried by the cartridge, is disclosed. The teaching machine includes an optical system which incorporates a movable focusing lens which is mounted on a very long lever arm. The lever arm is pivoted at one end and is adjustably mounted on a threaded post at the other end to permit motion of the lens toward and away from the transparency for focusing while still permitting maintenance of the focus across the entire width of the transparency. A drive mechanism is provided to selectively align specified visual segments with the optical system. The movable storage medium is movable independently of the transparency holder, and a transducer for reproducing audio frequency signals from the storage medium is provided. The transducer includes an improved indexing assembly to permit precise location with respect to the storage medium. The entire mechanical assembly is mounted on a single mounting plate to facilitate assembly of the machine.

13 Claims, 11 Drawing Figures

MECHANICAL ASSEMBLY FOR AUDIO-VISUAL TEACHING MACHINES

BACKGROUND OF THE INVENTION

The present invention relates, in general, to audio-visual teaching machines, and more particularly to a compact, inexpensive, rugged machine which has an improved mechanical assembly and improved optics for simplified operation and better reliability.

The uses of audio-visual devices in entertainment, commercial, and educational fields are well recognized, and such devices are in great demand. Because recent developments have produced lightweight, portable, easy to use machines, they have become very popular, particularly for use with the educationally disadvantaged, and in developing countries. Such uses, however, place a premium on reliability and low cost, on the ability of a machine to handle a wide variety of functions for more effective teaching and testing of students, on ease of use, and on accuracy in the coordination of visual and audio information. If such machines are to respond to the wide variety of uses to which they may be placed, the machines must have a capability for producing a wide variety of visual displays and narrative sequences not only in response to predetermined teaching patterns, but in response to the patterns of answers produced by the user of the machine during testing and learning procedures.

Although prior machines have been capable of producing extremely useful displays and accompanying narration, such devices have been limited in the patterns and responses they can provide, primarily because of limitations in the mechanical structure and the control circuitry of such machines. The increased need for greater flexibility in establishing desired patterns and programs for instruction or testing, and the need to allow changes in existing patterns and procedures to permit machines to be updated to meet new techniques and series and to accommodate newly developed programs, is now recognized, however, and it is to meet these needs in an improved manner that the present invention was developed.

Typical of prior art machines is that described and illustrated in U.S. Pat. No. 3,504,445 to Goldmark et al, issued Apr. 7, 1970. An improved version of the Goldmark device is disclosed in U.S. application Ser. No. 352,917, filed Feb. 26, 1982, entitled "Improved Audio-Visual Teaching Machine and Control System Therefor", which application is assigned to the assignee of the present application. The present invention is directed to improvements in the apparatus disclosed in U.S. Pat. No. 4,482,328 issued Nov. 13, 1984 and accordingly the disclosure of that application is hereby incorporated by reference.

SUMMARY OF THE INVENTION

It is an object of the present invention to provide an improved audio-visual teaching machine which is less complex, and thus less expensive, is stronger and more reliable, and thus is a distinct improvement over the prior art.

The Goldmark Pat. No. 3,504,445 discloses an apparatus for projecting spaced visual information segments carried by a holder and for reproducing sound information recorded on a movable storage medium carried by the holder. The apparatus includes a housing for receiving an audio-visual cartridge which includes the holder and the storage medium. An optical system is mounted in the housing for projecting one of the visual information segments onto a self-contained screen. A drive mechanism for the holder is also mounted in the housing and is adapted to selectively drive the holder to align selected visual segments with the optical projector. The storage medium, which preferrably is a grooved record, is mounted within the holder, and a drive motor mounted within the housing selectively moves the storage medium independently of the holder to permit reproduction of prerecorded information from the storage medium.

The patent further discloses sound reproducing apparatus including a transducer responsive to the information recorded on the storage medium. The transducer is mounted in the housing for operative engagement with the storage medium and for reproducing such information when the storage medium is moved by its drive mechanism. The recorded material is audio frequency information which includes narrative portions corresponding to the various visual segments, and control information portions interspersed between the narrative portions. The sound reproducing apparatus responds to this audio information to produce audio frequency signals, the narrative portion of which is fed directly to an audio frequency amplifier and to a loudspeaker. The control information portion, which is in the form of audible tone signals, is fed through a tone separator to activate suitable relays to operate the machine in predetermined modes.

The Ferguson et al application Ser. No. 352,917 is directed to a modified version of the Goldmark Pat. No. 3,504,445, and provides a microprocessor which responds to control information carried by the storage medium to operate the audio-visual machine in accordance with instructions provided by that control information itself, or in accordance with predetermined procedures or subroutines stored in the microprocessor and called up by the control information. In one form the invention, the control portions of the audio frequency information carried by the storage medium are in the form of data words interspersed between the narrative portions. As an alternative, the data words may be located at the beginning of the storage medium and stored in the microprocessor memory before the narrative portions are reached. These data words can then be called up by short audio tones intermingled with the narrative portions of the information signals.

The data words are a coded series of audio frequency signal bursts which, after decoding, are used to provide instructions to the microprocessor as required to operate the visual display in a selected pattern, which may be predetermined, or which may vary in accordance with the user's responses to questions, and to operate the storage medium to correspond with the visual display. In the preferred form, the data word is formatted to have a 16 bit recognition pattern to distinguish data signals from the narrative signals, with the recognition pattern being followed by 24 bits of data. This recognition pattern insures that the microprocessor will not inadvertently be activated by the narrative.

A data word can, among other things, select one of the plurality of modes of operation of which the machine is capable. Thus, for example, a data word may instruct the microprocessor to follow a specified subroutine stored in a read only memory (ROM) of the microprocessor, this ROM storage capacity permitting some patterns of operation to be called up by relatively short data words thereby to conserve recording time in the storage medium. Although in a preferred form of the invention some routines will be established within the microprocessor in permanent form, it may be found desirable to provide a read/write memory to which new or modified subroutines can be stored from an external source, such as any specially prepared record medium, to permit new programs of operation to be developed, allowing the machine to be continuously updated and providing maximum flexibility of operation.

The apparatus of the invention provides two distinct modes of operation, a teaching mode and a testing mode. For purposes of this disclosure, a teaching mode refers to essentially automatic operation wherein a predetermined sequence of visual displays is accompanied by a correspondingly predetermined sequence of narratives which refer to the displays. In this mode, the device proceeds through the entire audio-visual program without modification by the user of the machine. On the other hand, a testing mode, for purposes of this disclosure, may be considered to be an operation wherein a user response is required in the sequence. In such a case, for example, an audible question may accompany a visual display, with a reply by the machine operator being required before the program will advance to the next step. It will be apparent that the response need not be to a question, but the sequence requires some operator participation. In the latter mode, the sequence of visual displays and the corresponding sequence of narrative may be varied in accordance with the particular operator response. Thus, for example, if a question is asked and the response is an incorrect answer, the next visual display may be different than if the answer had been correctly given. It will be understood that a teaching mode may in reality also require operator response, but a distinction between these modes is made herein for purposes of clarity. The various modes of operation and the subroutines which may be utilized in the machine of the present invention are described in detail in the aforesaid application Ser. No. 352,917 of Ferguson et al, and need not be repeated here.

The present invention provides all of the operating and control features of the system set out in the Ferguson et al application Ser. No. 352,917, but a variety of modifications and refinements have been made in the apparatus described therein.

Thus, the present apparatus has been designed to be mounted almost entirely on a single base plate, or mounting plate, to facilitate construction of the device and to provide strength and rigidity. The plate carries an optical system, an audio pick up and index system, a drive assembly for the transparency holder portion of the cartridge, an audio drive mechanism for the audio storage medium carried by the cartridge, and a cartridge seating mechanism. Many of the parts are injection molded so as to snap together or to snap onto the mounting plate to insure accurate alignment.

A new optical system has been provided to project images from the transparencies used with the audio-visual cartridge. This optical system is designed to operate with a low voltage, inexpensive lamp while still providing a bright and accurate image on the projection screen. The lamp is located near the edge wall of the machine housing so as to permit easy cooling as well as easy accessibility for maintenance and repair purposes. The optical system incorporates a double element lens adjacent the lamp, a collimating lens, a 45° angle mirror which reflects the light up and through the transparency, a movable focusing lens, and another angled mirror for reflecting the image onto the display screen. The movable lens is mounted on a very long lever arm which is pivoted at one end and is adjustably mounted on a threaded post at the other end, with the lens being mounted near the end which is secured to the adjustment mechanism. This arrangement allows adequate motion of the lens toward and away from the transparency, while the long lever arm provides a sufficient degree of movement without causing the lens to turn through a substantial angle, thus maintaining the focus across the entire width of the transparency.

The audio pick-up mechanism includes a tone arm assembly for playing the records which are incorporated in the audio-visual cartridge. This assembly has been modified to provide a simplified indexing and cueing mechanism which allows the tone arm to be precisely positioned on the record. The indexing mechanism is pivotally mounted and adjustable by a screw thread, and carries a v-shaped centering guide, or cradle, which is movable upwardly and downwardly to lift and lower the tone arm. The tone arm itself carries an indexing finger which rests in the apex of the v-shaped cradle, the pointer sliding down to the apex whenever the cradle is lifted to thereby precisely locate the tone arm. The cradle is secured to a damper mechanism which permits rapid upward motion for lifting the tone arm, and which restricts the downward motion to insure that the stylus on the tone arm is set gently onto the record when it is lowered.

The audio-visual cartridge itself is essentially the same as that used with the Ferguson et al machine described in Ser. No. 352,917, and thus includes a record and a transparency holder, both of which are independently rotatable. The transparency holder does not include indexing detents for use in aligning the transparencies with the optical system, as in prior cartridges. Instead, it is driven by a "visual drive" stepping motor to provide precise positioning. The transparency holder is annular in shape and includes a single internal tooth which engages one of the outer peripheral teeth of a drive hub. The single tooth permits easy engagement with the drive hub and thus not only facilitates insertion of a cartridge into the machine, but also simplifies the manufacture of the cartridge. The drive hub is driven by the visual drive stepping motor to turn the transparency holder until bar markings on the transparencies themselves indicate, by means of a photocell detector system, that the film is indexed to the correct location. By placing the indexing signals on the transparencies themselves, alignment problems in the manufacture of the cartridge are avoided, and precise alignment of the transparencies with the machine optics is obtained.

The record carried in the audio-visual cartridge is driven by means of a turntable journaled in the mounting plate of the machine, the turntable engaging the record and lifting it free of the transparency holder so that it may rotate independently thereof. An audio drive stepping motor is secured to the bottom of the mounting plate and drives the turntable at a predetermined speed.

The audio-visual cartridge is supported in the machine by a seating mechanism which consists of two injection molded plastic pieces, a bottom support piece, or "cone", and a top piece, or cover. The cone is shaped to provide three seats for receiving and holding the cartridge in position for proper operation. The cone also provides a holder for a portion of the optical system, and provides a mounting shaft for the reduction pulley used to drive the transparency holder. The cover protects the tone arm assembly and optical assembly from damage when the cartridge is inserted into the machine, and further acts as a guide to insure that the cartridge is properly positioned. The cone includes downwardly extending pegs which snap into suitable apertures in the mounting plate to insure proper alignment of the optical system and a proper fit for the cartridge.

The electronics of the present audio-visual teaching machine are essentially the same as in prior application Ser. No. 352,917, and the operation of the machine is similar. Accordingly, the present apparatus incorporates a decoder which responds to audio frequency data word signals produced by the tone arm to convert those signals into a digital form which is usable by the microprocessor. The decoder also operates to produce a time base pulse train which is supplied to the microprocessor to serve as the time base for pulse recognition of the data signals. This time base reconstruction permits asynchronous operation of the system so that it will function to distinguish the data signals from the narrative signals and from background noise. In operation, the microprocessor responds to the data input which is received from the storage medium and from the manually operated control keys to produce output signals which operate the various drive motors, tone arm lifting solenoid, and various LED displays provided on the machine. These displays indicate which portion of the storage medium is being played, indicate the number of errors that have been made by the operator either in a given chapter or cumulatively, confirm the number of the transparency being projected on the screen, and indicate what action the operator is to take if the permissible number of errors is exceeded. The processor also provides an output to an external jack to which a hard copy printer may be connected to permit the printing of a permanent record of, for example, responses made by the machine operator. If desired, this output may also be connected to a programmable hand-held calculator for storage of such information and subsequent determination of patterns of errors and other information relating to the learning ability of the operator.

The present invention thus provides an improved portable, compact, audio-visual machine which is simple to use, is reliable, and which may be used for a variety of learning and teaching functions. The device provides flexibility through the use of a microprocessor and through the provision of data words on the storage medium used in the audio-visual machine, which data words provide instructions and programs to the microprocessor which are carried out by subroutines stored within the processor. The unit permits much more complex operation than was previously possible with machines of this type, while the improved tone arm assembly, optical system, cartridge assembly, and the overall layout of the mechanical system all cooperate to provide an improved system.

BRIEF DESCRIPTION OF THE DRAWINGS

The foregoing and additional objects, features and advantages of the present invention will be more clearly understood from a consideration of the detailed description of the invention set forth in the following specification, taken in conjunction with the accompanying drawings, in which.

DESCRIPTION OF A PREFERRED EMBODIMENT

Figure 1:
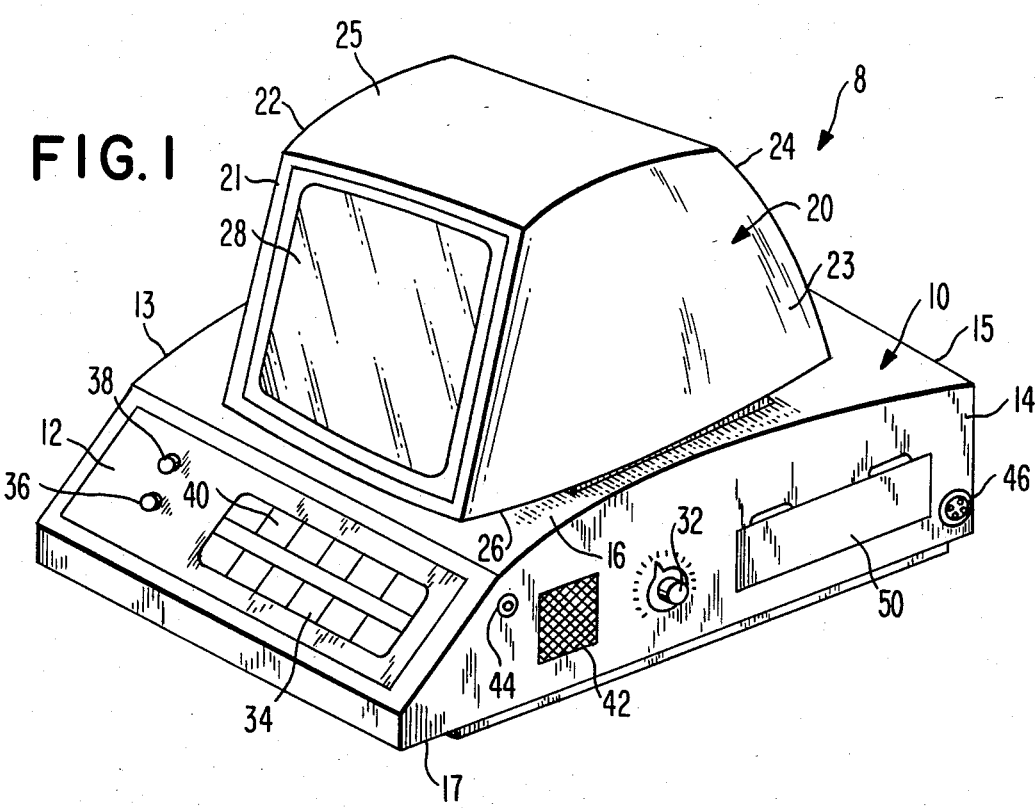
FIG. 1 is perspective view of one form of an exterior housing of an audio-visual machine constructed in accordance with the present invention.

Turning now to a more detailed consideration of a preferred form of the present invention, there is illustrated in FIG. 1 in diagrammatic form a perspective view of an audiovisual machine 8 utilizing the features of the present invention. The machine includes a housing having an upper casing 10 which includes a sloped front wall 12, side walls 13 and 14, a back wall 15, a top wall 16 and a bottom wall 17 to provide an enclosure for the mechanism to be described and for the electronic control circuitry. The housing further includes an upper casing 20 having front, side and rear walls 21, 22, 23 and 24, respectively, a top wall 25 and a bottom wall 26 forming an enclosure for a portion of the system optics and a display screen 28 onto which visual displays are projected. The optical system may include an adjustable mirror mounted within the upper casing 20 and an adjustable focusing lens (to be described) which may be adjusted by a focusing knob (not shown) accessible from outside the housing.

Mounted on the side wall 14 is a selector knob 32 which permits manual indexing of the position of the playback mechanism for the storage medium to be described. Extending across the front wall 12 of the casing 10 is an array 34 of control keys for manually controlling the operation of the machine. These keys are used by the machine operator to select answers to questions posed during a teaching or a testing program, in the manner described in the above-identified application Ser. No. 352,917.

A "ready" lamp 36 may be mounted on the front wall 12 of the machine to indicate when the operator is required to perform some function such as, for example, depressing one of the keys 34 designated as an "advance" key to initiate a program, or depressing one of the other keys 34 to select an answer after a question has been posed during a test mode of operation. An "error" lamp 38 may also be mounted on wall 12 of the machine to be illuminated whenever the operator depresses an answer key which does not correspond to the correct answer to the question posed by the machine program. Also mounted on wall 12 is a display unit 40 which provides a visual readout of the chapter being processed in the audio-visual program, of the number of errors made during that program or cumulatively over several programs, and of the procedures to be followed by the operator in the event a predetermined number of errors has been exceeded.

A loudspeaker 42 is mounted on the casing 10 and is coupled to the electronics within the machine. In addition, a jack 44 may also be mounted on the side wall 14 to receive the plug of a conventional headset for private use of the machine by an individual operator. An additional socket 46 may be provided for connecting peripheral equipment such as a hard copy printer, a hand-held calculator, or such other processing equipment as may be desired for evaluation of the operator's response to the particular program being played and for provision of permanent records, where desired. Conventional AC power may be supplied to the device by way of a power cord (not shown) or, if desired, the device may be made completely self-contained by the provision of a suitable battery pack (not shown) of conventional design. Preferably, the battery pack will operate at 12 volts so that the machine is also operable directly from a storage battery of the automotive type.

Figures 2, 6, 7:
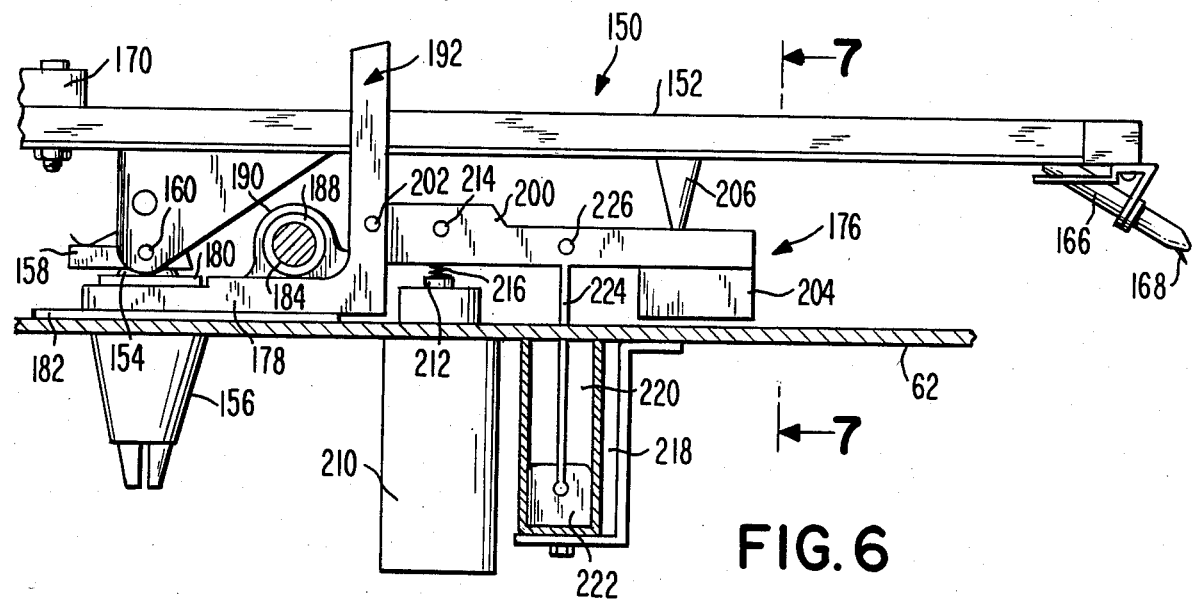
FIG. 2 is a top plan view of an audio-visual cartridge adapted for use in the machine of FIG. 1.
FIG. 6 is a side view in partial section of the tone arm assembly shown in FIGS. 3 and 4.
FIG. 7 is a sectional view of the tone arm assembly taken along the lines 7—7 of FIG. 6.

The side wall 14 includes an access door 50 adapted to receive an audio-visual cartridge 52 of the type shown in top plan view in FIG. 2. This cartridge is of the type described in the Goldmark et al Pat. No. 3,504,445, and reference is made to the disclosure thereof for details of this structure. The cartridge 52 includes a transparent, annular holder 54, and a corresponding retainer ring 55, both preferably formed of plastic, for mounting a plurality of circumferentially spaced visual information segments such as photographic transparencies 56. The cartridge also holds captive an independently rotatable storage medium such as a grooved record disk 58 which is coaxial with the transparency holder. In a typical embodiment of the invention, the holder 54 carries 52 spaced 16 mm film segments arrayed in a circle around the record 58.

Recorded in the grooves of the record 58 are audio narrative information portions which may correspond to selected film segments, the exact correspondence being either predetermined or variable in accordance with the operator's response pattern. In addition, the record includes a plurality of control information portions comprising data words in the form of audio frequency bursts in coded form. These data words are interposed between each of the narrative portions, in the preferred form of the invention.

Figure 3:
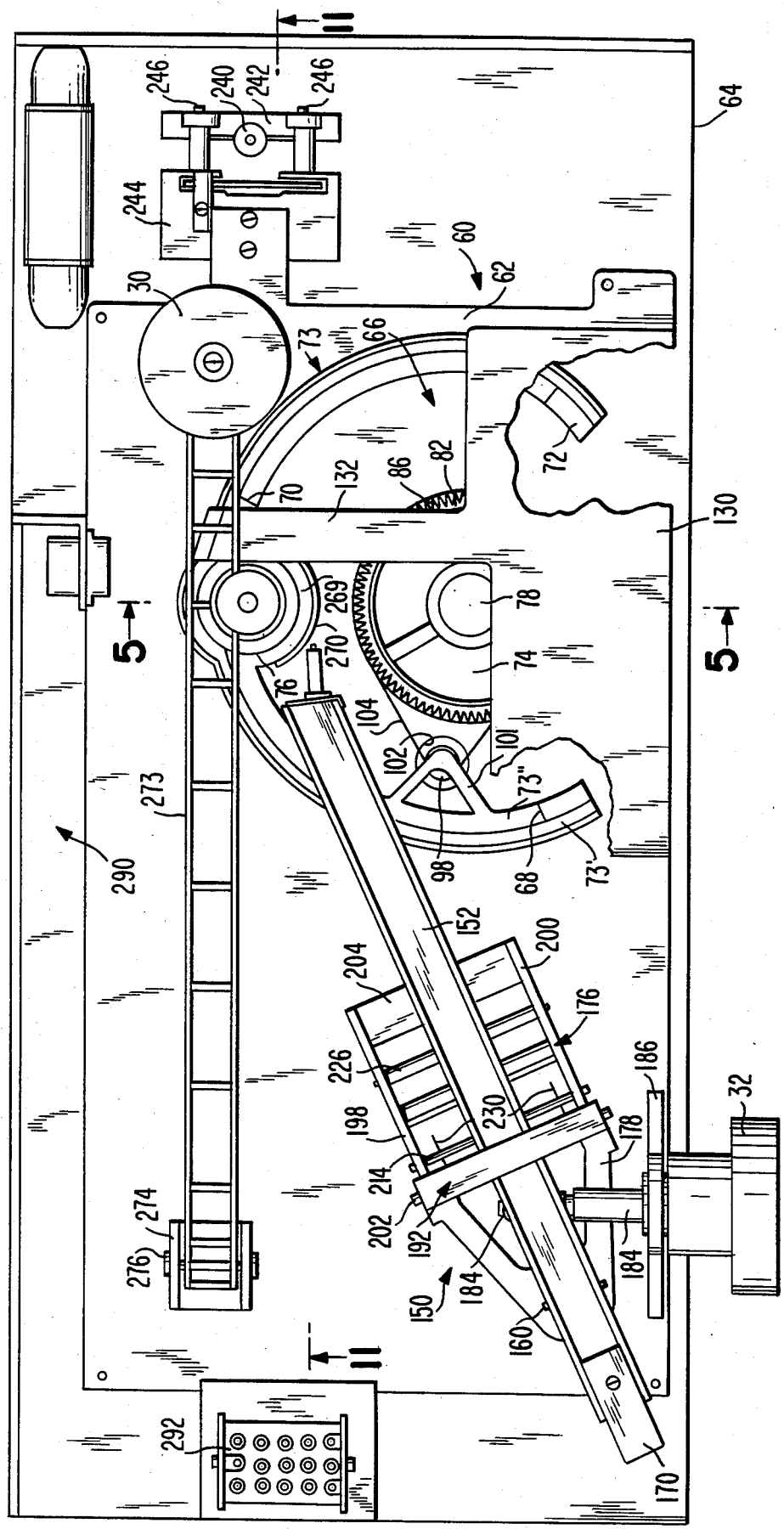
FIG. 3 is a top plan view of the interior operating mechanism of the machine of FIG. 1.
Figure 4:
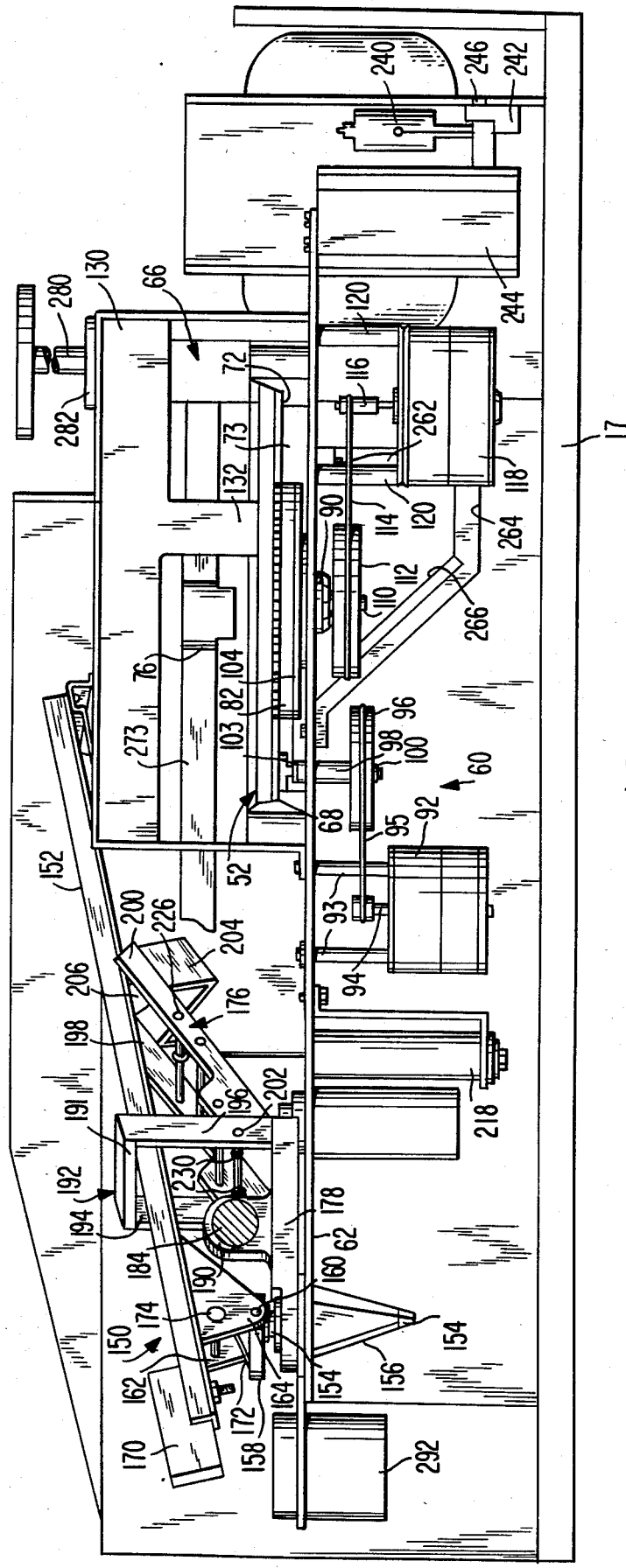
FIG. 4 is a front elevation of the apparatus of FIG. 3, in partial section.

The cartridge 52, when inserted into the audio-visual machine 8 by way of door 50 is received by the playback mechanism of the present invention, which is indicated generally at 60 in FIGS. 3 and 4, to which reference is now made. The playback mechanism shown in these Figures is mounted within the casing 10, although it should be understood that the illustrated casing is merely diagrammatic and is for the purpose of showing a suitable housing for the mechanism. Changes in the layout and design of the casing may be made without departing from the present invention. The playback mechanism 60 is carried on a single mounting plate 62 which is, in turn, supported by the bottom panel 17 of the housing. The provision of a single mounting plate 62 is a significant improvement over prior audio-visual machines since it not only simplifies assembly and alignment of the various mechanical elements of the machine, but also facilitates repair and maintenance.

The assembly illustrated in FIGS. 3 and 4 may be mounted, for example, in the housing 10, extending from left to right (as viewed in FIG. 1) between walls 12 and 15, with the access door 50 on the wall 14 of the housing leading into the cartridge receiving area 66. The cartridge 52 (see FIG. 4) is received by three seating members 68, 70 and 72, which are formed on the horizontal support surface 73 of a seating cone 73, to position the cartridge with respect to a turntable 74 and a focusing lens 76. The seating cone has an inner tapered guide wall 73' which surrounds the support surface 73" and provides a positive centering of the cartridge as it is placed into the machine so that the central aperture 77 of the record 58 (FIG. 2) will be centered over and engage the spindle 78 of the turntable. As the cartridge is moved into position and drops onto the support members 68, 70 and 72, the record 58 falls over the spindle 78 and is lifted off the transparency holder portion 54 of the cartridge, freeing the record for rotation with respect thereto (see FIG. 5) as the holder portion drops further down onto the support members.

The seating cone 73 is a one-piece element which is generally annular in shape, and which extends in an arc between the seating elements 68, 70 and 72 (FIG. 3). The cone includes pegs 79 (FIG. 5) which snap into the plate 62 to secure and accurately position the seating cone. The cone incorporates not only the seating elements 68, 70 and 72, but also provides a shaft for the visual drive pulley (to be described) and a support for one of the lens sets for the optical system (to be described) to insure accurate location of these components. Preferably, the seating cone is an injection molded plastic piece.

Figure 5:
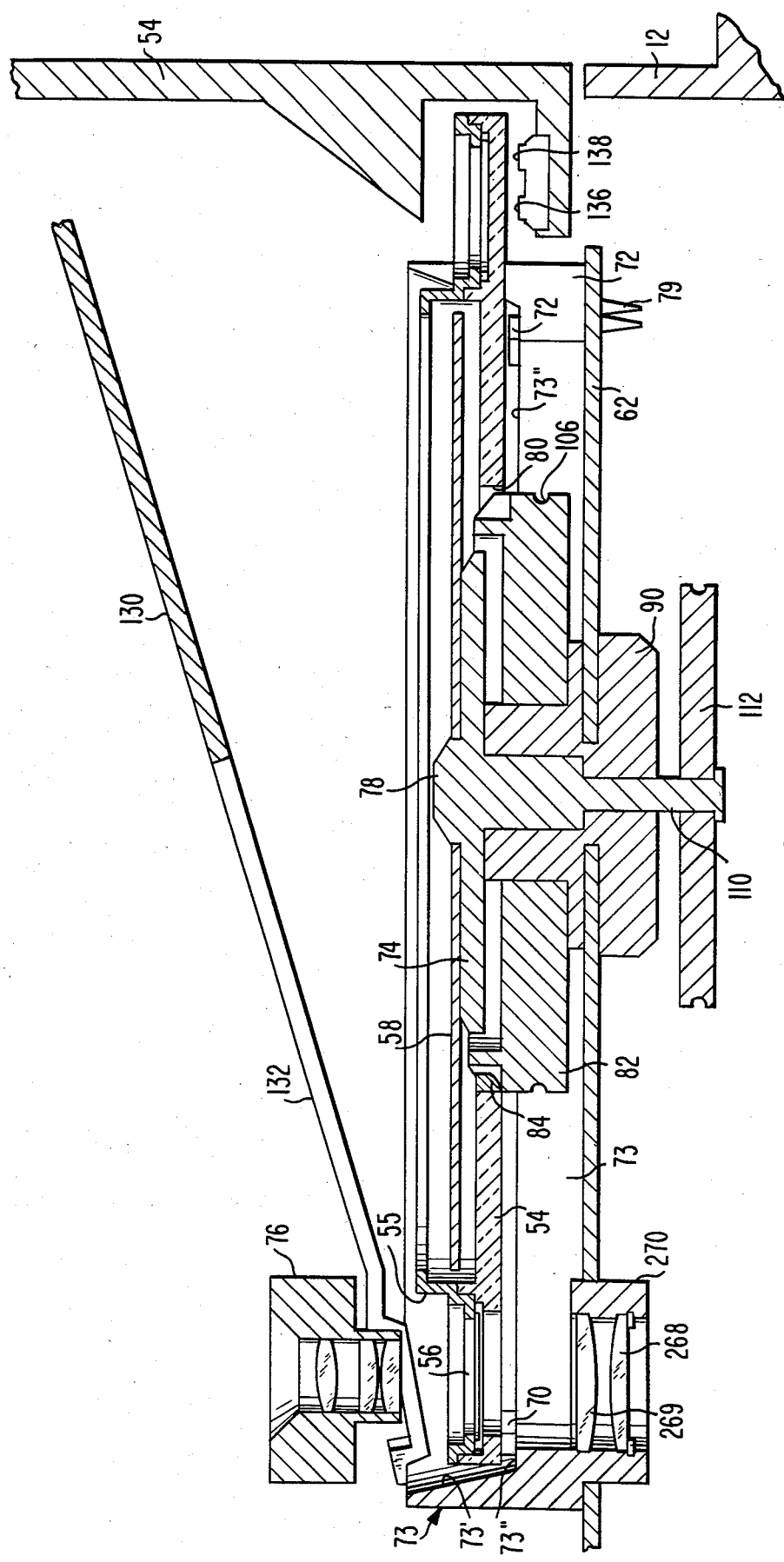
FIG. 5 is a cross sectional view of the cartridge drive mechanism taken along line 5—5 of FIG. 3.

When the cartridge 52 is in playing position, the film holder 54 rests on the upper horizontal support surfaces of the seats 68, 70 and 72 in the manner illustrated in FIG. 5 for the support 70. The supports are so arranged as to insure that the transparencies in the holder are at the proper angle with respect to the optical projection path to insure clear image projection. The inner peripheral surface 80 of the annular holder 54 surrounds a toothed drive hub 82 when properly seated. The surface 80 is annular and fits closely adjacent to the exterior surface of the hub 82. The holder 54 carries a single inwardly extending tooth 84 which is adapted to engage one of the plurality of teeth 86 formed on the outer surface of hub 82. The single-tooth engagement between the transparency holder 54 and the drive hub 82 permits easy insertion of the cartridge into the machine while permitting a positive driving relationship between the hub and the holder.

Hub 82 is rotatably mounted on a bushing 90 which is secured in the support plate 62, the hub being driven by a suitable stepping motor 92 (FIG. 4) mounted to the under surface of plate 62 by mounting legs 93. The drive shaft 94 of motor 92 is drivingly connected by way of belt 95 to an intermediate drive pulley 96 mounted by means of hollow shaft 98 on a downwardly extending support shaft 100 which is formed as an integral part of cone 73. Shaft 100 extends down from cone extension 101 (FIG. 3), which is a part of the seating cone 73 the shaft 100 extending through an aperture 102 in plate 62, and receives shaft 98. On the upper end of shaft 98 is a groove 103 for receiving a drive belt 104 which connects pulley 96 to the hub 82. The drive belt is positioned on the hub 82 by means of a suitable groove 106 (FIG. 5). Motor 92 is a conventional D.C. stepping motor which rotates through a predetermined fixed angle each time it is energized and which provides fast starting and stopping, whereby the rotation of the hub 82, and thus of the transparency holder 54, may be precisely controlled in very small steps. This enables the individual transparencies carried by holder 54 to be precisely positioned with respect to the system optics. The electronic controls for the stepping motor are conventional, and provide two speeds forward or reverse. The drive pulleys provide a speed reduction which allows the transparency holder to be driven at about 6 rpm at slow speed, to give good position control.

The spindle 78 of turntable 74 is mounted in the bushing 90 and includes a drive shaft 110 which extends through the bushing 90 and below the mounting plate 62. The lower end of the shaft 110 carries a pulley 112 which is connected by means of a suitable drive belt 114 to the shaft 116 of a turntable drive motor 118. The motor 118 is a D.C. stepping motor similar to motor 92, and is mounted to the under surface of plate 62 by means of mounting legs 120. In one form of the invention, the motor speed and pulley size are selected to drive the turntable at 22.5 rpm.

A cartridge housing cover plate 130 is mounted over the cartridge receiving area 66 to protect the tone arm and optical system when the cartridge is inserted, and to provide a guide arm 132 which serves to guide the cartridge into position on the seats 68, 70 and 72. As shown in FIG. 5, the cartridge receiving area is closed by access door 54, which may be hingedly connected to the wall 14 of the casing 10. The door 54 carries a light source 136 and a photocell 138 which are positioned next to the cartridge when it is properly positioned and the door is closed. When a cartridge is in place, light from source 136 is reflected onto the photocell 138, thereby enabling the photocell to provide an output to the system electronics which indicates that the machine can be operated. If the door is open, or if there is no cartridge in place, the photocell provides a signal which prevents operation of the machine. This insures that the tone arm will not be activated unless a cartridge is in place, and protects the tone arm stylus.

The movable storage medium 58 (FIG. 5) is a grooved record disk which carries narrative information and control information, both recorded at audio frequencies. This information is obtained from the disk by means of a playback transducer in the form of a tone arm assembly, generally indicated at 150 in FIGS. 3, 4 and 6, which includes an elongated tone arm 152 which is generally u-shaped in cross-section and is pivotally and rotationally mounted at its left-hand end (as viewed in FIG. 6). The tone arm is mounted by vertical rotatable shaft 154 mounted in a bushing 156 which passes through and snaps into an aperture in the support plate 62. The shaft 154 carries at its upper end a horizontal mounting block 158 which rotates with shaft 154, and on which the tone arm 152 is mounted by means of a horizontal pivot pin 160. The pin 160 is perpendicular to the axis of shaft 154 so that the tone arm rotates in a horizontal plane on shaft 154 and pivots in a vertical plane on pin 160. Tone arm 152 is secured to pin 160 by means of depending flanges 162 and 164 secured near the rearward end of the arm (to the left as viewed in FIG. 6).

The forward end of the tone arm (the right-hand end as viewed in FIG. 6) carries a conventional tone arm cartridge 166 at an angle suitable to provide proper tracking. The cartridge 166 has a stylus 168 adapted to engage the grooves of the record 58 to reproduce the audio frequency sounds recorded thereon. The rearward end of the tone arm carries an adjustable counterweight 170 which serves to balance the tone arm about the pivot pin 160 so as to regulate the pressure applied by the tone arm to the record when the tone arm is in the playback position. A suitable counterbalance spring 172 may be secured to a mounting pin 174 passing between the flanges 162 and 164, with the spring engaging the upper surface of mounting block 158 to supply a downward tracking pressure on the forward end of the tone arm, if required.

The tone arm may be raised and lowered by means of a cueing assembly 176 which may also be used to index the tone arm to a desired location on the record, whereby desired narrative segments on the record can be selected by the operator. The cueing and indexing assembly 176 includes a rotatable indexing platform 178 which is mounted on the exterior surface of the bushing 156, the bushing having upper and lower annular shoulders 180 and 182 which secure the platform 178 in position and allow it to rotate about the vertical axis of the shaft 154. The motion of the platform 178 is controlled by means of a horizontal threaded shaft 184 journaled in a bushing 186 secured to the mounting platform 62 adjacent the location of the tone arm. Rotation of the shaft 184 is controlled by means of the indexing knob 32 (FIG. 3). The shaft 184 engages an internally threaded bushing 188 mounted on the platform 178 and pivotally journaled in a mounting block 190. As the shaft 184 is rotated, the bushing is threaded onto or off of the shaft, causing the indexing platform 178 to pivot clockwise or counter-clockwise about the shaft 154, the bushing 188 pivoting within the mounting block 190 to maintain its alignment with the shaft 184.

Mounted on the forward end of indexing platform 178 is a vertical stop 192 which is in the shape of an inverted U which straddles the tone arm 152. The horizontal leg 191 of the U-shaped stop serves to limit the upward motion of the tone arm 152, while the downwardly extending legs 194 and 196 receive a pair of cueing arms 198 and 200, respectively, the cueing arms being secured to the downwardly extending legs by means of a pivot pin 202. The pivot pin 202 allows the cueing arms to pivot vertically on the U-shaped stop 192 between a lowered position illustrated in FIG. 6, and a raised position illustrated in FIG. 4.

Secured between the free ends of the cueing arms 198 and 200 is a v-shaped indexing cradle 204 (FIG. 7) which adapted to receive a corresponding downwardly-protruding, cone-shaped indexing finger 206 secured to the bottom of the tone arm 152. The indexing cradle 204 is moved vertically by the pivotal motion of the cueing arms 198 and 200 and, when moved toward its raised position as illustrated in FIG. 4, it engages the indexing finger 206 to lift the tone arm, thereby to disengage the stylus 168 from the surface of a record. At the same time, the downwardly sloping surfaces of the indexing cradle cause the indexing finger to slide downwardly toward the apex of the v-shaped cradle, thereby rotating the tone arm about shaft 154 to align the tone arm with the cueing arms. Since the indexing cradle is mounted by way of cueing arms 198 and 200 to the pivotable indexing platform 178, the v-shaped cradle 204 may be rotated about the shaft 154 by means of the indexing knob 32, thereby permitting easy and accurate location of the tone arm 152 with respect to the record carried by cartridge 52.

The vertical motion of the cueing arms 198 and 200 is controlled by means of a solenoid 210 mounted on the platform 62 and having a movable armature 212 connected to a mounting pin 214 extending between the arms 198 and 200. The armature is connected to pin 214 by means of a coil spring 216 to provide an elastic connection to allow the solenoid plunger to complete its travel after the cueing assembly 176 has come to the end of its downward travel. Damping is accomplished by means of a damper mechanism 218 which is mounted under platform 62 and which is shown in section. The damper 218 includes a cylinder 220 in which is mounted a piston 222 connected by means of shaft 224 to a pin 226 extending between the arms 198 and 200. The piston 222 includes a one-way bleed port (not shown) which enables the piston to move upwardly without restriction and only slowly downwardly within the cylinder 220, thereby to dampen the downward motion of arms 198 and 200.

The cueing arms are biased towards their raised position by means of springs 230 which are mounted on pin 202 and which have free ends which engage shaft 214, as illustrated in FIGS. 3 and 4. Energization of solenoid 210 pulls the armature 212 downwardly to lower the cueing arms 198 and 200. The damping piston slows the downward motion of the cueing arms and thus lowers the tone arm gently onto a record. Upon denergization of the solenoid, the springs 230 raise the cueing arms quickly, thereby picking up the tone arm. When it is raised, the tone arm swings into alignment with apex of the v-shaped cradle so as automatically to index the tone arm to the desired position with respect to the record for further playback. This indexing arrangement allows the operator of the device or the instructor manually to position the tone arm, by means of adjusting knob 32, to a desired narrative portion of the record, thereby permitting certain lessons to be repeated or the program to be otherwise modified. The tone arm system allows the operator to select any part of a record with less than one complete revolution of the indexing knob; preferrably about a 270° rotation of the knob moves the tone arm completely across the record.

Energization and deenergization of the solenoid 210 is accomplished be means of the circuitry described in the aforesaid application Ser. No. 352,917. When deenergized, the tone arm is lifted by the bias springs on the cueing arms, and when energized the solenoid pulls the cueing arm down to allow the tone arm stylus to engage the record. The v-shaped cradle is moved far enough down to be clear of the tone arm, so it can move freely across the record 58.

As previously indicated, the tone arm 152 serves to reproduce the audio frequency information signals on the record disk 58, including the data word portions which provide the control information needed for the next following narrative portion or portions. The particular signals generated by the tone arm stylus are described in application Ser. No. 352,917 as including audio frequency electrical signals which represent data words and narrative. The narrative portion generally consists of amplitude modulated audio frequency signals representing voice signals to be reproduced by the loudspeaker 42 to provide audible instructions or questions concerning a visual display. Preceding each narrative portion are data words which comprise a series of constant amplitude tone bursts at a predetermined frequency which result in a series of substantially square wave pulses, or data bits. These data bits are arranged in coded patterns to provide the information required by the microprocessor for controlling the operation of the machine. In one form of the invention the data word may consist of forty data bits, with the first sixteen bits providing a recognition pattern for the microprocessor to enable it to distinguish between narrative and control signals. This recognition pattern may also include a squelch code which serves to block the audio frequency amplifier, thereby to prevent the data bits from being fed to the loudspeaker.

Following the recognition pattern portion of the data word is a control pattern which consists of twenty-four data bits providing the required information for the microprocessor. Such information may include instructions for the processor to shift the visual display film holder to the transparency required for the next narrative portion, controlling the drive motor for the turntable to prevent the narrative from starting until the required visual display is in place, establishing in the processor memory the answers to the questions to be asked in the next segment, calling up a subroutine stored in the microprocessor, and providing such other operational instructions as may be required, the exact instructions needed depending upon the previous program of the microprocessor taken together with the pattern of the operator's responses. At the end of the data word, the record disk is stopped until the visual display holder has been indexed to the desired location, and thereafter the turntable is restarted to play the next narrative portion.

The microprocessor which controls the machine of the present invention may be any conventional, commercially available microprocessor having a memory capacity sufficient to accommodate the data word instructions and the various subroutines required for the operation of the device. The microprocessor is mounted within the casing of the audio-visual unit and is connected to each of the manual control keys 34 to permit entry of information into the microprocessor. Additional inputs to the microprocessor carry signals from the photocell 138 as well as from other circuitry described in the aforesaid application Ser. No. 352,917. The microprocessor responds to the input data to provide a variety of control signals for operating the audio-visual device, including signals for activating the step motor 42 to advance the transparency holder 54 in the manner previously described. The step motor advances a sufficient number of steps to properly align the required transparency with the optical system for projection and display on screen 26.

In the present invention, the optical system includes a lamp 240 mounted on a suitable base 242 secured to a lens housing 244 in the form of an aluminum casting secured to the bottom of plate 62. The lamp base is secured to the lens housing by a pair of screws 246 for easy removal in the event a lamp requires replacement. Preferrably, the lamp is located at one end of the mechanical assembly so that it is conveniently near the end wall 15 of the casing 10 for easy access, as by way of an access door (not shown), whereby the bulb may easily be changed without requiring disassembly of the machine. Such a location also facilitates cooling of the lamp, thereby increasing its life and reducing heat damage to other components.

Figure 8:
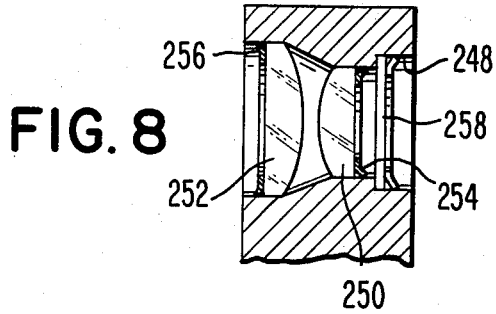
FIGS. 8 and 9 illustrate specific lens arrangements for the present machine.
Figure 9:
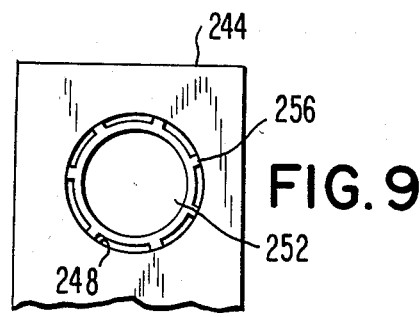

The lens housing 244 incorporates a lens aperture 248 (FIGS. 8 and 9). The lens aperture supports a pair of condenser lens elements 250 and 252, which are secured in the lens aperture by means of spring-type retainer clips 254 and 256, respectively. The lens carrier also includes a slot for an optional heat filter 258, which may be of heat-reflecting glass. It should be noted that the housing 244 is suspended above the bottom wall 17 of the casing (see FIG. 4) to protect the plastic casing from heat.

Figure 10:
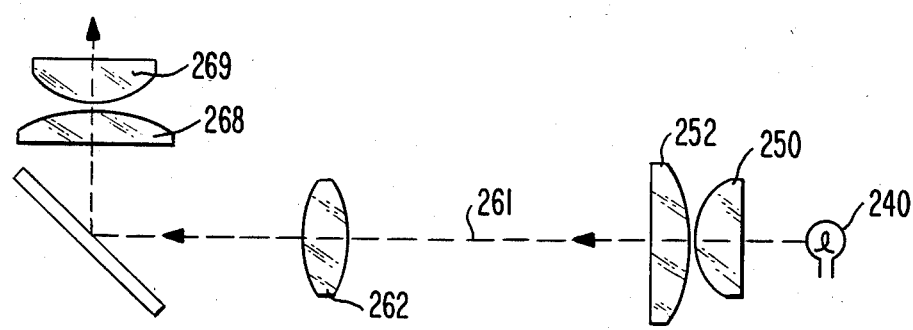
FIG. 10 is a diagrammatic view of the optical system used in the machine of FIG. 1.
Figure 11:
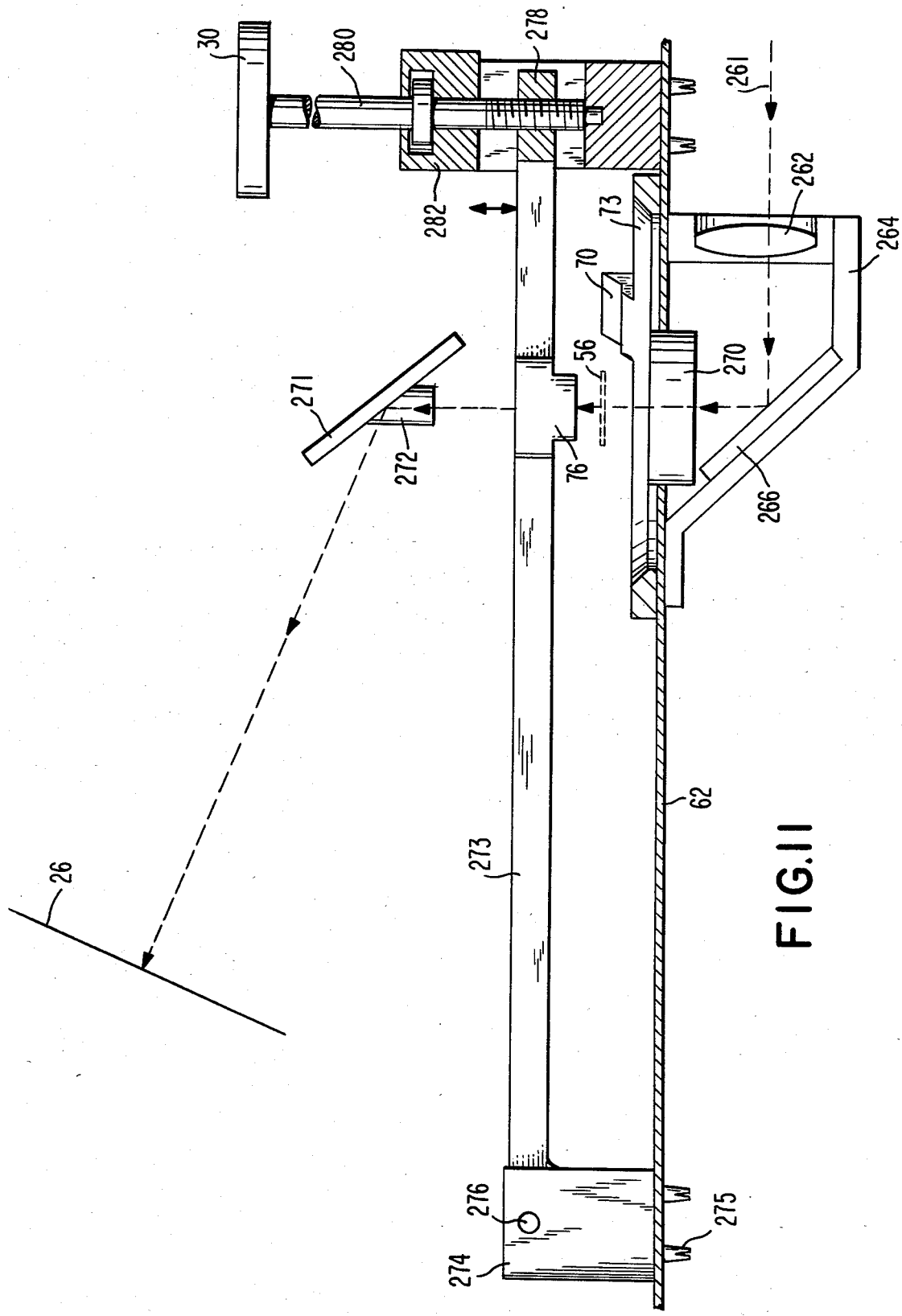
FIG. 11 is a partially diagrammatic, cross-sectional view of the mechanism of FIG. 3, taken along lines 11—11 and showing the optical system.

As diagrammatically illustrated in FIG. 10, light 261 from lamp 240 is directed by condenser lenses 250 and 252 through a collimating lens 262 which is mounted on a bracket 264 (FIG. 11) having suitable pins by which it can be snapped into place in apertures in the support plate 62. Lens 262 is held in bracket 264 by a retainer ring, and directs light from lamp 240 to a first mirror 266 which is arranged at an angle of approximately 45° and is secured on bracket 264, for example, by a suitable adhesive. The plastic bracket 264 is preferably honeycombed behind the mirror to pass through infrared light. The mirror 266 directs the light 261 upwardly through a second condenser lens pair 268 and 269. This pair of lenses is mounted in the plastic seating cone 73, which is shaped to provide a lens housing 270 which extends through a corresponding aperture in plate 62. The lens 268 may be held in the housing 270 by a retainer ring, while the upper lens 269 may be cemented in place, care being taken to insure correct alignment. The condenser pair 268, 269 directs the light 261 upwardly through transparencies secured in cartridge 52 and then through the projector focusing lens 76 (FIG. 5). This lens directs the image to a second, adjustable mirror 271 mounted in upper casing 20 (FIG. 1). This mirror then serves to direct the image from lamp 240 onto the screen 26.

A photocell 272 is mounted on the projector mirror 271 and is used to detect a bar pattern which is included on each transparency for use in determining when a transparency is properly aligned with the optical system. The first of the 52 transparencies has a different bar pattern which can be detected by the photocell 272 and is used to reset a frame counter in the system control circuitry. This frame counter then responds to signals produced by the photocell array 272 to keep track of the transparencies and to position a desired transparency in the light path.

The output of photocell array 272 may be used to control the operation of the stepping motor 92 in known manner to rotate the driving hub 82 and thus the transparency holder 54. Thus, the information carried by the transparencies produces a photocell output which is indicative of the angular position of the transparency holder, and this angular position identifies the particular transparency which is aligned with the optical system. This arrangement permits an accurate determination of the angular position of the holder and facilitates the operation of the device by providing information to the system microprocessor concerning the visual segments being displayed by the machine. The microprocessor may then use this information to determine the proper response required from the operator of the machine. This latter information may be based on data placed in storage in the microprocessor by means of a data word on the record medium 58 currently in use, or may be information previously placed in memory. This combination of the optical position detection and the use of data word storage of the responses required from the operator not only serves to eliminate the need for mechanical position detection of the type used in prior art devices, but also provides a more versatile educational tool, capable of analyzing the pattern of operator response to determine the particular sequence in which the transparencies are displayed.

It will be understood that the path of the light from the lens pair 268, 269 to focusing lens 76 passes through a transparency 56 secured in the holder 54 of cartridge 52, when a cartridge is placed within the machine of the present invention. Focusing lens 76 is adjustable with respect to the transparency 56 to focus the image carried by the transparency onto screen 26. Adjustment of the focusing lens 76 is accomplished by means of an elongated focusing bar 273 which is pivotally mounted at one end (the left-hand end as viewed in FIG. 11) to the plate 62 by means of a mounting bracket 274 which includes pins 275 which snap into apertures in the plate, and a pivot pin 276. The opposite, or free, end of the focusing bar carries an internally threaded bushing 278 which engages a threaded shaft 280 mounted vertically for rotation in a suitable mounting block 282 secured to plate 62. The mounting block secures the shaft 280 against vertical motion, whereby rotation of the shaft causes the bushing 278 to be threaded upwardly or downwardly therealong. Rotation of the shaft is manually controlled by the focusing knob 30.

The focusing lens is mounted on bar 273 at a location that is closer to the free end which carries bushing 278 than to the pivot point 276. This arrangement insures a long lever arm for the motion of the lens, providing a long radius for its arcuate motion. This insures a substantially linear vertical motion of the focusing lens with respect to the transparency 56 to provide proper focus across the entire width of the transparency.

The optical system operates with a low voltage, inexpensive lamp and a lens system which provides a bright and accurate image on the projection screen. The mounting of the focusing lens on a long lever arm which is pivoted at one end and threadedly adjustable at the other end allows adequate motion of the lens toward and away from the film strip without causing the lens to turn through a substantial angle, thus maintaining the focus across the entire width of the film.

The projection mirror 271 is shown only diagrammatically; however, in a preferred form of the invention, the mirror is secured on a plastic frame which also holds the photocell array 272, and is secured to the interior of casing 20 by means of three adjustment screws passing through three corresponding nuts molded into the plastic frame. The adjustment screws are accessible outside the casing 20 and may be used to adjust the angle of mirror 271 to properly position the image on screen 26. However, since adjustments will tend to cause slight image distortions, only minimum movement need be provided, as long as the mirror is accurately positioned in the case in initial assembly.

In operation, a cartridge 52 is inserted into the machine by way of opening 50 and is positioned on the supports 68, 70 and 72, with the record portion 58 being supported by the turntable 74. The tone arm is then positioned over the record by means of indexing shaft 184, rotation of which pivots the tone arm 152 into the desired location. The tone arm is then lowered by means of the solenoid 210 and cueing arms 198 and 200 to allow the stylus to engage the record. Energization of the turntable motor 118 causes the record to start to play, thereby producing audio frequency signals which are used to provide narrative and control data to the electrical circuitry. The control circuitry is mounted on suitable circuit boards which may be carried on the base 64 adjacent the platform 62, in the area generally indicated at 290. The circuit boards may be connected to the wiring for the stepping motors, lamp, photocells and solenoid of the mechanical assembly by way of a connector block 292 mounted on platform 62. The control circuitry indexes the stepping motor 92 to select the desired transparency which is then centered over the lens pair 268, 269, with the photocell array 272 insuring proper alignment in accordance with a coding strip on the film itself. The image is focused on the screen 26 by means of focusing lens 76, and the record is advanced to produce an audio output in the form of a voice narrative which provides suitable instruction to the user.

The improved mechanism described herein permits quick and inexpensive construction of a rugged and reliable audiovisual machine that is easy to operate, easy to maintain and easy to repair. Although the invention has been described in terms of a preferred embodiment, it will be understood that numerous variations and modifications may be made without departing from the true spirit and scope thereof, as set forth in the accompanying claims.

What is claimed is:

1. An improved audio-visual apparatus for projecting spaced visual information segments and for reproducing correlated audio information, comprising:
   a mounting plate;
   cartridge receiving means on said mounting plate for receiving an audio-visual cartridge which incorporates an audio information storage disc and an annular holder for securing visual information segments surrounding said disc;
   first drive means for rotatably driving said disc;
   second drive means for rotatably driving said annular holder to advance said visual information segments along an annular path;
   an optical system mounted on said mounting plate for projecting a selected visual information segment, said optical system including a light source, means for projecting light from said source through a fixed portion of said annular path, and an adjustable elongated focusing arm pivotally mounted at a first end and adjustably mounted at a second end on said mounting plate and including a lens mounted near said second end of said elongated focusing arm, said lens being located adjacent said fixed portion of said annular path and being moveable about an elongated radius to provide substantially linear motion for the lens;
   sound reproducing means including transducer means secured to a transducer arm rotatably and pivotally mounted on said mounting plate for providing selective engagement of said transducer means with said storage disc to reproduce audio information stored thereon, said sound reproducing means including manually adjustable indexing and cueing means for rotating said arm to position said transducer means over said disc and for raising and lowering said transducer; and
   control means for selectively energizing said first and second drive means and said cueing means in response to audio information on said disc to position selected visual information segments in said fixed portion of said annular path to cause said selected segments to be projected, and to drive said disc to produce audio information corresponding to said projected visual information segments.

2. The apparatus of claim 1, wherein said second drive means is a stepping motor which is selectively activated to accurately position said visual information segments.

3. The apparatus of claim 2, wherein each of said visual information segments includes coded segment identification data, and wherein said apparatus further includes photocell means adjacent said annular path and responsive to said coded segment identification data to provide identification signals to said control means for controlling the position of said annular holder.

4. The apparatus of claim 3, wherein said second end of said focusing arm is threadedly engaged with a rotatable, threaded focusing shaft, whereby rotation of said shaft pivots said focusing arm and adjusts said focusing lens with respect to a visual information segment to be projected.

5. The apparatus of claim 4, wherein said optical system includes a light source mounted adjacent one edge of said mounting plate for easy access and improved cooling.

6. The apparatus of claim 5, wherein said optical system includes condenser lens elements and a collimating lens for directing light from said light source to said fixed portion of said annular path, said light passing through any visual information segment positioned at said fixed portion of said annular path and to said focusing lens for projection thereby.

7. The apparatus of claim 1, wherein said first drive means includes turntable means mounted on said mounting plate for engaging said disc, and drive motor means mounted on said mounting plate and connected to drive said turntable.

8. The apparatus of claim 7, wherein said second drive means includes an annular hub mounted on said mounting plate, coaxially with said disc, said hub including a plurality of peripheral drive teeth adapted to engage a single drive tooth on the annular holder of an audio-visual cartridge.

9. The apparatus of claim 1, wherein said indexing and cueing means for said transducer arm includes a cueing arm pivotally mounted for vertical motion, and means responsive to said control means for slowly lowering said transducer arm and quickly raising it.

10. The apparatus of claim 9, wherein said means for lowering said cueing arm comprises solenoid means for actuating said arm and damping means for regulating the speed of motion of said arm.

11. The apparatus of claim 9, wherein said indexing and cueing means further includes V-shaped cradle means on said cueing arm for lifting said transducer arm, said transducer arm including centering means for aligning said transducer arm with the apex of said cradle means.

12. The apparatus of claim 11, wherein said indexing and cueing means further includes adjustable indexing means rotatably mounting said cueing arm on said mounting plate for rotating said cueing arm with respect to said mounting plate to position the apex of said cradle means at a desired location with respect to the disc of an audio-visual cartridge received on said mounting plate.

13. The apparatus of claim 12, further including a manually adjustable indexing shaft for selectively rotating said cueing arm.

* * * * *